US012571940B2

(12) United States Patent (10) Patent No.: US 12,571,940 B2
Shan (45) Date of Patent: Mar. 10, 2026

(54) LAMINATE HAVING MICROSTRUCTURED SUBSTRATE AND METHOD FOR PRODUCING THE LAMINATE

(71) Applicant: Essilor International, Charenton-le-pont (FR)

(72) Inventor: Haifeng Shan, Dallas, TX (US)

(73) Assignee: Essilor International, Charenton-le-pont (FR)

( * ) Notice: Subject to any disclaimer, the term of this patent is extended or adjusted under 35 U.S.C. 154(b) by 535 days.

(21) Appl. No.: 17/918,045

(22) PCT Filed: Apr. 12, 2021

(86) PCT No.: PCT/EP2021/059445
§ 371 (c)(1),
(2) Date: Oct. 10, 2022

(87) PCT Pub. No.: WO2021/209388
PCT Pub. Date: Oct. 21, 2021

(65) Prior Publication Data
US 2023/0128937 A1 Apr. 27, 2023

(30) Foreign Application Priority Data

Apr. 14, 2020 (EP) .................................... 20315166

(51) Int. Cl.
*G02B 1/04* (2006.01)
*B29C 48/08* (2019.01)
(Continued)

(52) U.S. Cl.
CPC .............. *G02B 1/041* (2013.01); *B29C 48/08* (2019.02); *B29C 59/022* (2013.01);
(Continued)

(58) Field of Classification Search
CPC ........ G02B 1/041; G02B 3/08; G02B 25/002; B29C 48/08; B29C 59/022;
(Continued)

(56) References Cited

U.S. PATENT DOCUMENTS

2009/0291206 A1 11/2009 Jiang
2011/0286222 A1* 11/2011 Coleman .............. G02B 6/0065
156/219
(Continued)

FOREIGN PATENT DOCUMENTS

CN 103128908 6/2013

OTHER PUBLICATIONS

International Search Report Written Opinion issued in Corresponding PCT PCT/EP2021/059445, dated Jul. 13, 2021.

*Primary Examiner* — James C. Jones
(74) *Attorney, Agent, or Firm* — Norton Rose Fulbright US LLP

(57) ABSTRACT

A laminate, including a substrate having a microstructure on a surface thereof; and a coating layer formed on the substrate and encapsulating the microstructure of the substrate. A glass transition temperature $T_1$ of the substrate is higher than a glass transition temperature $T_2$ of the coating layer. A method of producing an ophthalmic lens, including deforming the laminate into a shape of the ophthalmic lens by applying heat and/or pressure at a temperature of lower than $T_1$.

15 Claims, 2 Drawing Sheets

Thermoformer

Microstructure film

(51) Int. Cl.
    *B29C 59/02*       (2006.01)
    *C08J 7/04*        (2020.01)
    *G02B 3/08*       (2006.01)
    *G02B 25/00*     (2006.01)

(52) U.S. Cl.
    CPC .............. *C08J 7/0427* (2020.01); *G02B 3/08* (2013.01); *G02B 25/002* (2013.01); *B29C 2059/023* (2013.01); *C08J 2333/12* (2013.01); *C08J 2333/24* (2013.01); *C08J 2369/00* (2013.01); *C08J 2375/04* (2013.01); *G02F 2202/025* (2013.01); *G02F 2202/08* (2013.01)

(58) Field of Classification Search
    CPC ............... B29C 2059/023; C08J 7/0427; C08J 2333/12; C08J 2333/24; C08J 2369/00; C08J 2375/04; G02F 2202/025; G02F 2202/08; B29K 2023/00; B29K 2025/06; B29K 2033/08; B29K 2033/12; B29K 2069/00; B29K 2075/00; B29L 2011/0016
    See application file for complete search history.

(56) References Cited

U.S. PATENT DOCUMENTS

2016/0109622 A1     4/2016   Yoshida et al.
2019/0324293 A1    10/2019   Marshall et al.

\* cited by examiner

Insert

Microstructure film

Low Tg film

Temperature @ high Tg (T$_1$)

High Tg film

Temperature @ low Tg (T$_2$)

Low Tg film

High Tg film

Microstructure embossing      Microstructure encapsulation

LAMINATE HAVING MICROSTRUCTURED SUBSTRATE AND METHOD FOR PRODUCING THE LAMINATE

CROSS-REFERENCE TO RELATED APPLICATIONS

This application is a national phase application under 35 U.S.C. § 371 of International Application No. PCT/EP2021/059445 filed 12 Apr. 2021, which claims priority to European Patent Application No. 20315166.7 filed 14 Apr. 2020. The entire contents of each of the above-referenced disclosures is specifically incorporated by reference herein without disclaimer.

BACKGROUND

The present disclosure relates to a laminate including a substrate having a microstructure on the surface thereof, and a method for producing the laminate.

Lenses used for ophthalmic purposes may have a microstructured surface. For example, a microstructure may be formed on the lens surface or embedded in the lens for the purpose of myopia control, increasing optical power of the lens, and/or providing anti-reflective properties to the lens. To manufacture an ophthalmic lens having a microstructured surface, a film having a microstructured surface may be applied on the surface of a lens or embedded in a lens. The microstructured film may be treated with heat and/or pressure during a post processing process performed before and/or after application to the lens. The microstructure on the film surface may be destroyed during the post processing process due to the heat and/or pressure applied to the microstructure.

SUMMARY

According to the claims, the present disclosure relates to a laminate and a method for effectively manufacturing a film or a lens having a microstructured surface by protecting the microstructure during a post processing process.

One embodiment of the present disclosure is related to a laminate, including: a substrate having a microstructure on a surface thereof; and a coating layer formed on the substrate and encapsulating the microstructure of the substrate. A glass transition temperature $T_1$ of the substrate is higher than a glass transition temperature $T_2$ of the coating layer.

In one aspect, a refractive index $n_1$ of the substrate is different from a refractive index $n_2$ of the coating layer.

In one aspect, each of the substrate and the coating layer includes a thermoplastic, which is independently polycarbonate, thermoplastic urethane, polyacrylate, polyester, copolyester, polymethacrylate, polystyrene, polyamide, polysulfone, polyphenylsulfone, polyetherimide, polypentene, polyolefin, ionomer, ethylene methacrylic acid, cyclic olefin copolymer, acrylonitrile, styrene maleic anhydride, a copolymer thereof, or a derivative or mixture thereof. In one aspect, the substrate/coating layer combination is polycarbonate/polymethyl methacrylate, polysulfone/polyester, copolyester/polymethyl methacrylate, polyamide/polymethyl methacrylate, copolyester/thermoplastic urethane, or polyamide/polyamide.

In one aspect, a peel strength between the substrate and the coating layer is at least 100 g/25 mm measured under the test method ASTM D1876-01.

In one aspect, the substrate and coating layer are transparent.

In one aspect, the microstructure is formed by embossing the surface of the substrate.

In one aspect, the substrate is a micro lens for myopia control having the microstructure, the microstructure is Fresnel microstructure for increasing optical power of the substrate, or the microstructure is a moth eye microstructure for providing an anti-reflection property to the substrate. The substrate may have a thickness from 50 μm to 2 mm.

Another embodiment of the present disclosure is related to a method of producing an ophthalmic lens, including deforming the laminate described above into a shape of the ophthalmic lens by applying heat, pressure, or both.

Another embodiment of the present disclosure is related to a method of processing a substrate having a microstructure on a surface thereof, including: forming a coating layer on the substrate so that the coating layer encapsulates the microstructure of the substrate; and deforming a laminate of the substrate and the coating layer by applying heat, pressure, or both. A glass transition temperature $T_1$ of the substrate is higher than a glass transition temperature $T_2$ of the coating layer.

In one aspect, the laminate is deformed by thermoforming, and/or injection molding a hot melt polymer over the laminate at a temperature of lower than $T_1$.

Another embodiment of the present disclosure is related to a method of producing an ophthalmic lens, including: extruding a first polymer having a glass transition temperature $T_1$ to form a substrate; embossing a surface of the substrate to form a microstructure on the surface of the substrate; extruding a second polymer having a glass transition temperature $T_2$ to form a coating layer on the substrate so that the coating layer encapsulates the microstructure of the substrate; and deforming a laminate of the substrate and the coating layer into a shape of the ophthalmic lens by applying heat, pressure, or both. The glass transition temperature $T_1$ of the first polymer is higher than the glass transition temperature $T_2$ of the second polymer. The laminate is deformed by thermoforming and/or injection molding a hot melt polymer over the laminate at a temperature lower than $T_1$.

BRIEF DESCRIPTION OF THE DRAWINGS

A more complete appreciation of the embodiments and many of the attendant advantages thereof will be readily obtained as the same becomes better understood by reference to the following detailed description when considered in connection with the accompanying drawings.

DETAILED DESCRIPTION OF THE EMBODIMENTS

Figure 1A:
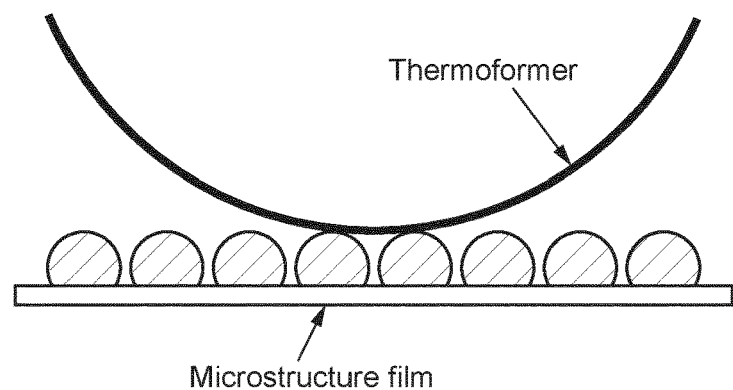
FIG. 1A illustrates a post processing process (thermoforming process) performed on a substrate having a microstructure by using a thermoformer.

Various embodiments of the present disclosure will now be described below.

A first embodiment is related to a laminate, including: a substrate having a microstructure on its surface; and a coating layer formed on the substrate and encapsulating the microstructure of the substrate.

The substrate has a microstructure on its surface. The structure and material of the substrate as well as the shape and size of the microstructure are not particularly limited.

In one aspect, the substrate may be a film or a layer that is suitably included in, attached to, or used as an ophthalmic lens.

The substrate may include, or may be made of, a polymer, for example a thermoplastic polymer. Examples of the thermoplastic polymers included in or constituting the substrate include, but are not limited to, polycarbonate, thermoplastic urethane, polyacrylate, polyester, copolyester, polymethacrylate, polystyrene, polyamide, polysulfone, polyphenylsulfone, polyetherimide, polypentene, polyolefin, ionomer, ethylene methacrylic acid, cyclic olefin copolymer, acrylonitrile, and styrene maleic anhydride.

A copolymer of these polymers may also be used. The copolymer may have two or more structures derived from different polymers in one molecule. The copolymer may include at least one structure derived from a polymer other than those described above.

A derivative of the polymers described above may also be used. The derivative may have at least one functional group bonded to the molecule of the polymers described above.

A mixture of these polymers, copolymers, and/or derivative may also be used. The mixture may be a resin including two or more molecules of different polymers. The mixture may include at least one polymer other than those described above.

The substrate may contain various additives, dyes, and/or light filters. Examples of additives may include, but are not limited to, heat stabilizers, mold release, HALS (hindered amine light stabilizers), and light stabilizers. The dyes may be, for example, color balancing dyes, photochromic dyes, dichroic dyes. The light filters may be, for example, blue light cut dyes, UV cut dyes, IR cut dyes, or any other functional constituent. Those additives, dyes, and light filters may be used alone or in any combinations.

In one embodiment, the substrate is transparent. As used herein the term "transparent" is intended to mean that a substance is capable of transmitting visible light so that articles situated behind the substance is visible by a naked eye. The visual light transmittance (Tv %) of the coating layer may be 75-98%, preferably 80-95%, including all ranges and subranges therebetween. The color of the substrate is not particularly limited.

The thickness of the substrate is not particularly limited and may be determined based on the application of the substrate. When the substrate is used for an ophthalmic purpose, the thickness ($h_1$) of the substrate may be from 50 μm to 2 mm.

In one aspect, the microstructure may be a structure that is suitably applied on an ophthalmic lens. Examples of the microstructure include, but are not limited to, a structure for controlling myopia; a structure for increasing optical power of the substrate, such as Fresnel microstructure; and a structure for providing anti-reflection properties to the substrate, such as moth eye structure.

The microstructure may be formed on one or both surfaces of the substrate. In one embodiment, the microstructure may be formed on one surface of the substrate. The microstructure may be formed by any process or method. For example, the microstructure may be formed on a surface of the substrate by embossing the surface of the substrate.

In the present embodiment, the coating layer is formed on the substrate and encapsulates the microstructure of the substrate. In one embodiment, the coating layer is completely filled between the gaps of the microstructure.

The coating layer may include, or may be made of, a polymer, for example a thermoplastic polymer. The thermoplastic polymers described above, as well as the copolymers and derivatives of these polymers described above and mixtures thereof may be used. The coating layer may also include additives, dyes, and/or light filters described above.

In one embodiment, the coating layer is transparent. The visual light transmittance (Tv %) of the coating layer may be 75-98%, preferably 80-95%, including all ranges and subranges therebetween. The color of the coating layer is not particularly limited.

In one aspect of the present embodiment, the glass transition temperature ($T_1$) of the substrate is higher than the glass transition temperature ($T_2$) of the coating layer. Thus, the material(s) of the coating layer may be determined based on the material of the substrate, and vice versa. Each of $T_1$ and $T_2$ may be from 80 to 200° C., preferably from 85 to 190° C., including all ranges and subranges therebetween. The difference between $T_1$ and $T_2$ may be from 10 to 100° C., preferably from 12 to 75° C., including all ranges and subranges therebetween.

For example, when the substrate is made of or includes polycarbonate, the coating layer may be made of or includes polymethyl methacrylate. When the substrate is made of or includes polysulfone, the coating layer may be made of or include polyester. When the substrate is made of or includes copolyester, the coating layer may be made of or include polymethyl methacrylate. When the substrate is made of or includes polyamide, the coating layer may be made of or include polymethyl methacrylate. When the substrate is made of or includes copolyester, the coating layer may be made of or include thermoplastic urethane. Also, the substrate and the coating layer may be made of the same polymer as long as the glass transition temperature ($T_1$) of the substrate is higher than the glass transition temperature ($T_2$) of the coating layer. For example, when the substrate is made of or includes polyamide, the coating layer may be made of or include polyamide having a glass transition temperature lower than the glass transition temperature of the polyamide in the substrate. These combinations are provided for exemplary purposes only, and the combination of the materials of the substrate and the coating layer is not particularly limited, as long as the glass transition temperature ($T_1$) of the substrate is higher than a glass transition temperature ($T_2$) of the coating layer.

In one aspect, the refractive index of the coating layer ($n_2$) is different from the refractive index of the substrate ($n_1$). Each of $n_1$ and $n_2$ may be from 1.45 to 1.65, preferably from 1.49 to 1.64, including all ranges and subranges therebetween.

The thickness ($h_2$) of the coating layer may be determined based on the size of the microstructure on the surface of the substrate, and/or based on the thickness ($h_1$) of the substrate and the modulus of the substrate and the coating layer.

The minimum thickness ($h_{2,\ min}$) of the coating layer may be equal to the height of the microstructure on the surface of the substrate, or calculated using the following equation (1), whichever is larger:

$$h_{2,min} = h_1 \times (E_1/E_2) \qquad (1),$$

where $E_1$ is the modulus of the substrate and $E_2$ is the modulus of the coating layer.

The coating layer may be sufficiently thick so that the microstructure on the surface of the substrate is substantially, or completely, embedded in the coating layer.

The maximum thickness ($h_{2, max}$) of the coating layer is not particularly limited, and may be determined based on the application of the laminate.

The material of the coating layer may have good compatibility with the material of the substrate so that the coating layer is strongly bonded to the substrate. In one aspect, the coating layer may be bonded to the substrate so that the peel strength (measured under the test method ASTM D1876-01) between the substrate and the coating layer is at least 100 g/25 mm.

The shape and size of the laminate is not particularly limited. When the laminate is used for an ophthalmic purpose, the laminate may be in a shape and size that are suitable for an ophthalmic lens.

In one embodiment, the laminate is transparent. The color of the laminate is not particularly limited. When the laminate is used for an ophthalmic purpose, the laminate in one embodiment has high clarity.

The laminate may include at least one additional layer as long as it does not interfere with the properties of the substrate and the coating layer. In one embodiment, the additional layer(s) is formed on the surface of the substrate opposite to the surface on which the coating layer is formed.

Figure 1B:
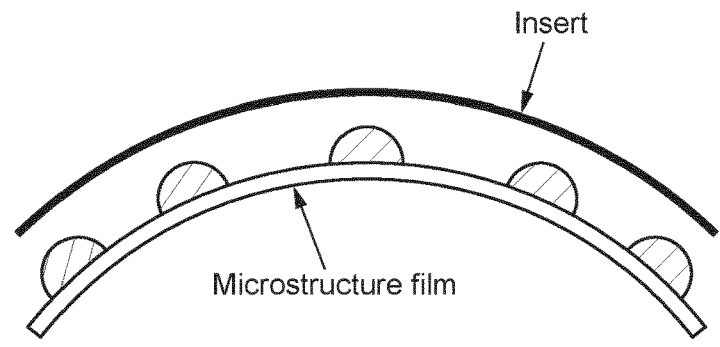
FIG. 1B illustrates a post processing process (injection molding) performed on a substrate having a microstructure with an insert.

When the coating layer is not present on the substrate, the microstructure formed on the substrate surface may deform when pressure and/or heat is applied to the substrate. For example, when the substrate is a film or a layer included in or used as an ophthalmic lens, the substrate is often subjected to a post processing process to deform the substrate into a desired curve and/or a shape. The post processing process may be thermoforming and/or injection molding performed by applying pressure and/or heat to the substrate with a third party, such as a thermoformer during a thermoforming process and an insert during injection molding. FIG. 1A illustrates a thermoforming process performed by using a thermoformer, and FIG. 1B illustrates an injection molding process performed with an insert. Without the coating layer, the pressure applied onto the microstructure by the thermoformer or insert, as well as the heat applied during the thermoforming or injection molding process, may destroy the microstructure.

Figure 2A:
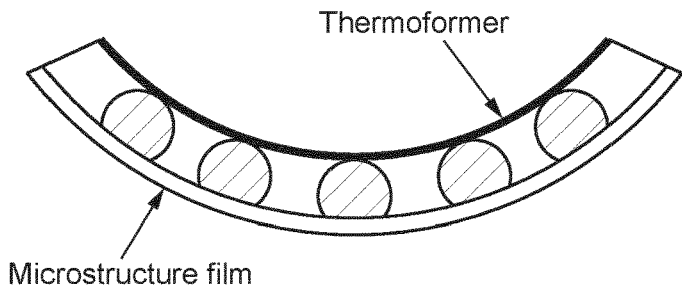
FIG. 2A illustrates a post processing process (thermoforming process) performed on a laminate of a substrate having a microstructure and a coating layer by using a thermoformer.
Figure 2B:
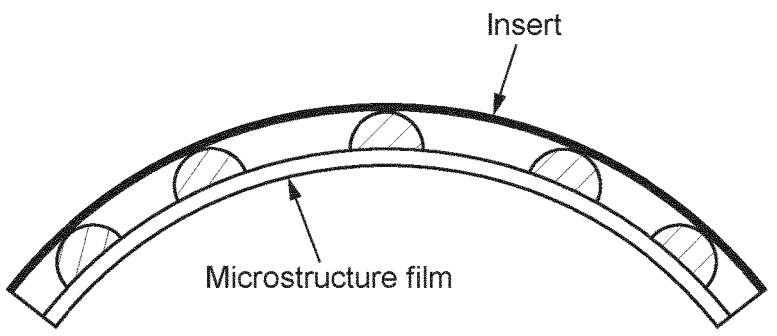
FIG. 2B illustrates a post processing process (injection molding) performed on a laminate of a substrate having a microstructure and a coating layer with an insert.

On the other hand, when the coating layer is provided on the substrate, the coating layer can protect the microstructure from the pressure and/or heat applied during a post processing process. FIG. 2A illustrates a thermoforming process performed by using a thermoformer, and FIG. 2B illustrates an injection molding process performed with an insert. Due to the presence of the coating layer, the pressure and heat are not directly applied to the microstructure, and the microstructure can be protected during these post processing processes.

In the present embodiment, the glass transition temperature ($T_1$) of the substrate is higher than the glass transition temperature ($T_2$) of the coating layer. When a post processing process is performed at a temperature around $T_2$ and lower than $T_1$, the coating layer may be deformed, while the microstructure formed on the surface of the substrate may not be deformed. As used herein, the "temperature around $T_2$" may be $T_2 \pm 15°$ C., preferably $T_2 \pm 10°$ C., more preferably $T_2 \pm 5°$ C., more preferably $T_2 \pm 3°$ C., and particularly preferably $T_2 \pm 1°$ C., and includes the exact temperature $T_2$.

A second embodiment is related to a method of producing an ophthalmic lens, including: deforming the laminate described above into a shape of the ophthalmic lens by applying heat, pressure, or both.

The deformation may be performed by, for example, a thermoforming process using a thermoformer, or an injection molding process with an insert. During the deformation, the laminate may be inserted in a mold in such a manner that the pressure is directly applied on the coating layer of the laminate. A polymer lens may also be inserted in the mold along with the laminate so that the laminate is injection-molded with the polymer lens. The polymer lens may be made of or include the material of the substrate. The laminate may also be inserted in the mold against an insert, and a hot polymer melt may be injection molded onto the laminate.

The deformation may be performed at a temperature lower than the glass transition temperature ($T_1$) of the substrate. In one embodiment, the deformation may be performed at a temperature around the glass transition temperature ($T_2$) of the coating layer and lower than the glass transition temperature ($T_1$) of the substrate. By performing the deformation at such a temperature, the laminate may be deformed, while the microstructure formed on the surface of the substrate may not be deformed.

The pressure is not particularly limited, as long as the laminate can be deformed into a desired shape under the temperature applied during the deformation process.

A third embodiment is related to a method of processing a substrate having a microstructure on its surface.

First, a coating layer is formed on the substrate so that the coating layer encapsulates the microstructure of the substrate. In one embodiment, the coating layer completely fills the gap of the microstructure.

The substrate of the first embodiment described above may be used as the substrate in the present embodiment. The coating layer formed on the substrate in the present embodiment may have the materials, structures, and properties of the coating layer of the first embodiment described above. Any materials may be used for forming the coating layer, as long as the glass transition temperature ($T_1$) of the substrate is higher than a glass transition temperature ($T_2$) of the coating layer.

Second, a laminate of the substrate and the coating layer is deformed by applying heat, pressure, or both.

The deformation may be performed by, for example, a thermoforming process using a thermoformer, or an injection molding process with an insert. During the deformation, the laminate may be inserted in a mold in such a manner that the pressure is directly applied on the coating layer of the laminate. A polymer lens may also be inserted in the mold along with the laminate so that the laminate is injection-molded with the polymer lens. The polymer lens may be made of or include the material of the substrate. The laminate may also be inserted in the mold against an insert, and a hot polymer melt may be injection molded onto the laminate.

The deformation may be performed at a temperature lower than the glass transition temperature ($T_1$) of the substrate. In one embodiment, the deformation may be performed at a temperature around the glass transition temperature ($T_2$) of the coating layer and lower than the glass transition temperature ($T_1$) of the substrate. By deforming the laminate at such a temperature, the laminate may be deformed, while the microstructure formed on the surface of the substrate may not be deformed.

The pressure is not particularly limited, as long as the laminate can be deformed into a desired shape under the temperature applied during the deformation process.

Figure 3:
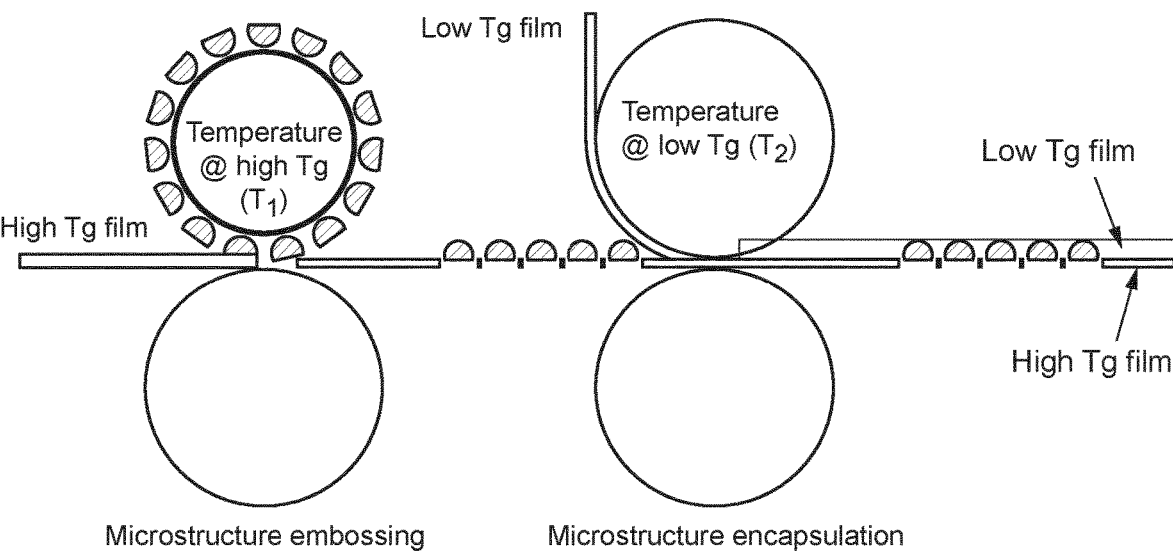
FIG. 3 illustrates an exemplary process for producing a laminate of a substrate having a microstructured surface and a coating layer.

A fourth embodiment is related to a method of producing an ophthalmic lens. FIG. 3 illustrates an exemplary process for producing an ophthalmic lens.

First, a first polymer having a glass transition temperature $T_1$ is extruded to form a substrate. The formed substrate is indicated as a high Tg film in FIG. 3.

The first polymer may be a thermoplastic polymer included in or constituting the substrate of the laminate of the first embodiment described above. The first polymer may be a copolymer or a derivative of those thermoplastic polymers, or a mixture thereof. The first polymer may include at least one polymer other than the polymers, copolymers, and mixtures described above. The first polymer may also include additives, dyes, and/or light filters described above.

Second, a surface of the substrate is embossed to form a microstructure on the surface of the substrate. FIG. 3 shows emboss rolls for embossing the surface of the formed substrate. The formed substrate is moved from left to right in FIG. 3 so that the surface of the formed substrate is embossed by the emboss rolls.

The embossing may be performed at a temperature around the glass transition temperature $(T_1)$ of the first polymer. As used herein, the "temperature around $T_1$" may be $T_1 \pm 15°$ C., preferably $T_1 \pm 10°$ C., more preferably $T_1 \pm 5°$ C., more preferably $T_1 \pm 3°$ C., and particularly preferably $T_1 \pm 1°$ C., and includes the exact temperature $T_1$.

FIG. 3 illustrates embossing on one surface of the substrate, but both surfaces of the substrate may be embossed.

The microstructure formed by the embossing is not particularly limited as long as it is suitably applied on an ophthalmic lens. Examples of the microstructure include, but are not limited to, a structure for controlling myopia; a structure for increasing optical power of the substrate, such as Fresnel microstructure; and a structure for providing anti-reflection properties to the substrate, such as moth eye structure. In one embodiment, one surface of the substrate is embossed.

Third, a second polymer having a glass transition temperature $T_2$ is extruded to form a coating layer on the substrate so that the coating layer encapsulates the microstructure of the substrate. FIG. 3 shows a coating layer (indicated as Low Tg film in FIG. 3) formed by extruding the second polymer is provided on the surface of the substrate on which the microstructure is formed, and a pressure is applied with rolls so that the coating layer is bonded to the substrate and encapsulates the microstructure. The coating layer may be applied on the microstructured surface of the substrate at a temperature around the glass transition temperature $(T_2)$ of the second polymer. In one embodiment, the coating layer is pressed onto the substrate while heating at a temperature lower than $T_1$, for example, at a temperature around $T_2$, so that the second polymer completely fills the gap between the microstructure, while the microstructure of the substrate is not deformed.

The second polymer may be any thermoplastic polymer, as long as its glass transition temperature $(T_2)$ is lower than the glass transition temperature $(T_1)$ of the first polymer. For example, the thermoplastic polymers used as the first polymer may also be used as the second polymer.

Fourth, a laminate of the substrate and the coating layer is deformed into a shape of the ophthalmic lens by applying heat, pressure, or both. The deformation may be performed by, for example, a thermoforming process using a thermoformer, or an injection molding process with an insert. During the deformation, the laminate may be inserted in a mold in such a manner that the pressure is directly applied on the coating layer of the laminate. A polymer lens may also be inserted in the mold along with the laminate so that the laminate is injection-molded with the polymer lens. The polymer lens may be made of or include the material of the substrate. The laminate may also be inserted in the mold against an insert, and a hot polymer melt may be injection molded onto the laminate.

The deformation may be performed at a temperature lower than the glass transition temperature $(T_1)$ of the first polymer. In one embodiment, the deformation may be performed at a temperature around the glass transition temperature $(T_2)$ of the second polymer and lower than the glass transition temperature $(T_1)$ of the first polymer. By performing the deformation at such a temperature, the laminate may be deformed, while the microstructure formed on the surface of the substrate may not be deformed.

The pressure is not particularly limited, as long as the laminate can be deformed into a desired shape of the ophthalmic lens under the temperature applied during the deformation process.

EXAMPLES

The following examples are illustrative and do not limit in any way the present embodiments.

Example 1: Laminate of Polycarbonate (PC) Substrate and Polymethyl Methacrylate (PMMA) Coating Layer 1-1: Table 1 below summarizes the glass transition temperatures (Tg), refractive indexes (RI), and visual transmittances (Tv %) of polycarbonate (PC) and polymethyl methacrylate (PMMA). PC and PMMA are compatible with each other and can form strong adhesion between their interfaces.

TABLE 1

|  | Supplier | Tg (° C.) | RI | Tv % |
|---|---|---|---|---|
| PC | Teijin | 149 | 1.59 | 89 |
| PMMA | Evonik | 100 | 1.49 | 92 |

1-2: PC/PMMA Dual Layer Film Extrusion

A PC film was first extruded using a single screw extruder at temperature of 255° C., and then embossed at temperature of around 149° C. to produce microstructure on its surface. High fidelity replication was achieved, as embossing was done at the softening point of PC. A PMMA film was then laminated onto the PC film at temperature of 100° C., to encapsulate the microstructure. PMMA completely filled in the gaps between the microstructure, as PMMA is soft deformable at its Tg. The microstructure was well encapsulated by PMMA, but not destroyed or deformed, as PC is still rigid at 100° C., which is below its Tg.

1-3: PC/PMMA Dual Layer Film Thermoforming

The PC/PMMA dual layer film prepared in 1-2 was then thermoformed at 100° C. to a target curvature. The microstructure was intact after thermoforming, as PC is rigid at 100° C., due to its high Tg of 149° C.

1-4: PMMA Lens Overmolding onto PC/PMMA Dual Film

The thermoformed PC/PMMA dual layer film prepared in 1-3 was placed inside the mold which has temperature of slightly below 100° C. PMMA was injection molded onto the PC/PMMA dual film, clamped at high pressure and then cooled down. The obtained lens was ejected from the mold. An ophthalmic lens with high fidelity microstructure was thus produced.

Example 2: Laminate of Polysulfone (PSU) Substrate and Copolyester (Co-PEST) Coating Layer 2-1: Table 2 below summarizes the glass transition temperatures (Tg), refractive indexes (RI), and visual transmittances (Tv %) of polysulfone (PSU) and co-polyester (Co-PEST). PSU and Co-PEST are compatible with each other and can form strong adhesion between their interfaces.

TABLE 2

|  | Supplier | Tg (° C.) | RI | Tv % |
|---|---|---|---|---|
| PSU | Solvay | 185 | 1.64 | 80 |
| Co-PEST | Eastman Chemical | 113 | 1.57 | 90 |

2-2: PSU/Co-PEST Dual Layer Film Extrusion

A PSU film was first extruded using a single screw extruder at temperature of 350° C., and then embossed at temperature of around 185° C. to produce microstructure on its surface. High fidelity replication was achieved, as embossing was done at the softening point of PSU.

A Co-PEST film was then laminated onto the PSU film at temperature of 115° C., to encapsulate the microstructure. Co-PEST completely filled in the gaps between the microstructure, as PMMA is soft and deformable at its Tg. The microstructure was well encapsulated by co-PEST, but not destroyed or deformed, as PSU is still rigid at 115° C., which is below its Tg.

2-3: PSU/Co-PEST Dual Layer Film Thermoforming

The PSU/Co-PEST dual layer film prepared in 2-2 was then thermoformed at 115° C. to a target curvature. The microstructure was intact after thermoforming, as PSU is rigid at 115° C., due to its high Tg of 185° C.

2-4: Co-PEST Lens Overmolding onto PSU/Co-PEST Dual Film

The thermoformed PSU/Co-PEST dual layer film prepared in 2-3 was placed inside the mold which has temperature of slightly below 115° C. Co-PEST was injection molded onto the PSU/co-PEST dual film, clamped at high pressure and then cooled down. The obtained lens was ejected from the mold. An ophthalmic lens with high fidelity microstructure was thus produced.

Example 3: Laminate of Copolyester (Co-PEST) Substrate and Polymethyl Methacrylate (PMMA) Coating Layer Table 3 below summarizes the glass transition temperatures (Tg), refractive indexes (RI), and visual transmittances (Tv %) of co-polyester (Co-PEST) and polymethyl methacrylate (PMMA).

TABLE 3

|  | Supplier | Tg (° C.) | RI | Tv % |
|---|---|---|---|---|
| Co-PEST | Eastman Chemical | 113 | 1.57 | 90 |
| PMMA | Evonik | 100 | 1.49 | 92 |

10

Example 4: Laminate of Polyamide (PA) Substrate and Polymetyl Methacrylate (PMMA) Coating Layer Table 4 below summarizes the glass transition temperatures (Tg), refractive indexes (RI), and visual transmittances (Tv %) of polyamide (PA) and polymethyl methacrylate (PMMA).

TABLE 4

|  | Supplier | Tg (° C.) | RI | Tv % |
|---|---|---|---|---|
| Polyamide | Evonik | 130 | 1.59 | 89 |
| PMMA | Evonik | 100 | 1.49 | 92 |

Example 5: Laminate of Copolyester (Co-PEST) Substrate and Thermoplastic Urethane (TPU) Coating Layer Table 5 below summarizes the glass transition temperatures (Tg), refractive indexes (RI), and visual transmittances (Tv %) of copolyester (Co-PEST) and thermoplastic urethane (TPU).

TABLE 5

|  | Supplier | Tg (° C.) | RI | Tv % |
|---|---|---|---|---|
| Co-PEST | Eastman Chemical | 113 | 1.57 | 90 |
| TPU | Lubrizol | 90 | 1.60 | 89 |

Example 6: Laminate of Hi-Tg Polyamide (PA) Substrate and Low-Lg Polyamide (PA) Coating Layer Table 6 below summarizes the glass transition temperatures (Tg), refractive indexes (RI), and visual transmittances (Tv %) of polyamides having different Tg.

TABLE 6

|  | Supplier | Tg (° C.) | RI | Tv % |
|---|---|---|---|---|
| PA | EMS-Grivory | 162 | 1.63 | 87 |
| PA | Evonik | 125 | 1.52 | 91 |

Obviously, numerous modifications and variations of the present embodiments are possible in light of the above disclosures. It is therefore to be understood that within the scope of the appended claims, the embodiments may be practiced otherwise than as specifically described herein.

The invention claimed is:

1. A laminate, comprising:
   a substrate having a microstructure on a surface thereof; and
   a coating layer formed on the substrate and encapsulating the microstructure of the substrate,
      wherein a glass transition temperature $T_1$ of the substrate is higher than a glass transition temperature $T_2$ of the coating layer.

2. The laminate of claim 1, wherein a refractive index ni of the substrate is different from a refractive index $n_2$ of the coating layer.

3. The laminate of claim 1, wherein each of the substrate and the coating layer comprises a thermoplastic, which is independently selected from a group consisting of polycarbonate, thermoplastic urethane, polyacrylate, polyester, copolyester, polymethacrylate, polystyrene, polyamide, polysulfone, polyphenylsulfone, polyetherimide, polypentene, polyolefin, ionomer, ethylene methacrylic acid, cyclic olefin copolymer, acrylonitrile, styrene maleic anhydride, a copolymer thereof, or a derivative or mixture thereof.

4. The laminate of claim 1, wherein a peel strength between the substrate and the coating layer is at least 100 g/25 mm measured under the test method ASTM D1876-01.

5. The laminate of claim 1, wherein the substrate and coating layer are transparent.

6. The laminate of claim 1, wherein the substrate comprises:

polycarbonate and the coating layer comprises polymethyl methacrylate, or polysulfone and the coating layer comprises polyester, or copolyester and the coating layer comprises polymethyl methacrylate, or polyamide and the coating layer comprises polymethyl methacrylate, or copolyester and the coating layer comprises thermoplastic urethane, or polyamide and the coating layer comprises polyamide.

7. The laminate of claim 1, wherein the microstructure is formed by embossing the surface of the substrate.

8. The laminate of claim 1, wherein the substrate is a micro lens for myopia control having the microstructure, the microstructure is Fresnel microstructure for increasing optical power of the substrate, or the microstructure is a moth eye microstructure for providing an anti-reflection property to the substrate.

9. The laminate of claim 1, wherein the substrate has a thickness from 50 µm to 2 mm.

10. A method of producing an ophthalmic lens comprising the laminate of claim 1, the method comprising:

deforming the laminate into a shape of the ophthalmic lens by applying heat, pressure, or both;

wherein a glass transition temperature T1 of the substrate is higher than a glass transition temperature T2 of the coating layer.

11. A method of processing a substrate having a microstructure on a surface thereof, the method comprising:

forming a coating layer on the substrate such that the coating layer encapsulates the microstructure of the substrate; and deforming a laminate of the substrate and the coating layer by applying heat, pressure, or both, wherein a glass transition temperature $T_1$ of the substrate is higher than a glass transition temperature $T_2$ of the coating layer.

12. The method of claim 11, wherein the laminate is deformed by thermoforming, and/or injection molding a hot melt polymer over the laminate at a temperature of lower than $T_1$.

13. The method of claim 11, wherein the substrate comprises:

polycarbonate and the coating layer comprises polymethyl methacrylate, or polysulfone and the coating layer comprises polyester, or copolyester and the coating layer comprises polymethyl methacrylate, or polyamide and the coating layer comprises polymethyl methacrylate, or copolyester and the coating layer comprises thermoplastic urethane, or polyamide and the coating layer comprises polyamide.

14. The method of claim 10, comprising:

extruding a first polymer having a glass transition temperature $T_1$ to form a substrate;

embossing a surface of the substrate to form the microstructure on the surface of the substrate;

extruding a second polymer having a glass transition temperature $T_2$ to form the coating layer on the substrate such that the coating layer encapsulates the microstructure of the substrate to form the laminate; and deforming the laminate according to the method of claim 10 the laminate is deformed by thermoforming and/or injection molding a hot melt polymer over the laminate at a temperature lower than $T_1$.

15. The method of claim 14, wherein the substrate comprises:

polycarbonate and the coating layer comprises polymethyl methacrylate, or polysulfone and the coating layer comprises polyester, or copolyester and the coating layer comprises polymethyl methacrylate, or polyamide and the coating layer comprises polymethyl methacrylate, or copolyester and the coating layer comprises thermoplastic urethane, or polyamide and the coating layer comprises polyamide.

* * * * *